(12) United States Patent
Akiyama et al.

(10) Patent No.: US 7,020,065 B2
(45) Date of Patent: Mar. 28, 2006

(54) OPTICAL INFORMATION RECORDING MEDIUM, AND METHOD AND APPARATUS FOR RECORDING/REPRODUCING INFORMATION THEREON

(75) Inventors: Tetsuya Akiyama, Hirakata (JP); Kenichi Nishiuchi, Hirakata (JP); Kenji Narumi, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 214 days.

(21) Appl. No.: 10/600,089

(22) Filed: Jun. 20, 2003

(65) Prior Publication Data

US 2004/0090897 A1 May 13, 2004

Related U.S. Application Data

(62) Division of application No. 09/812,533, filed on Mar. 20, 2001, now Pat. No. 6,754,143.

(30) Foreign Application Priority Data

| Mar. 24, 2000 | (JP) | ........................................ 2000-084282 |
| Aug. 1, 2000 | (JP) | ........................................ 2000-232632 |

(51) Int. Cl.
  *G11B 7/00* (2006.01)

(52) U.S. Cl. .................................................. 369/275.3
(58) Field of Classification Search .............. 369/275.3, 369/44.13, 47.1, 47.27
See application file for complete search history.

(56) References Cited

U.S. PATENT DOCUMENTS

| 5,452,284 A | 9/1995 | Miyagawa et al. |
| 5,616,390 A | 4/1997 | Miyagawa et al. |
| 5,726,969 A | 3/1998 | Moriya et al. |

(Continued)

FOREIGN PATENT DOCUMENTS

| EP | 0 549 488 | 6/1993 |
| EP | 0 715 301 | 6/1996 |
| EP | 0 756 279 A2 | 1/1997 |

(Continued)

OTHER PUBLICATIONS

Chinichi Tanaka, et al.; "Additional Information Recording Method on DVD–ROM Disck: BCA (Burst Cutting Area)" Technical Research Report of the Institute of Electronics, Information and Communication Engineers, MR97–33; Oct. 1997; pp. 33–38. (Partial English Translation).

*Primary Examiner*—Nabil Hindi
(74) *Attorney, Agent, or Firm*—Hamre, Schumann, Mueller & Larson, P.C.

(57) ABSTRACT

The present invention relates to an optical information recording medium including a disk-shaped transparent substrate and a recording layer for recording, reproducing or erasing information by irradiation of laser light, the recording layer being formed over the substrate. The recording layer of the present invention includes information tracks including groove tracks and land tracks that are formed alternately in a radial direction of the disk. The information tracks comprise information recording regions and address regions interposed between the information recording regions, the information recording regions and the address regions being arranged along the tracking direction of the laser light. In the information recording regions, every second step in the radial direction of steps for dividing the groove tracks from the land tracks adjacent to the groove tracks is wobbled in the tracking direction, and in a range whose ends are defined by the address regions the every second step is wobbled at a constant frequency. Prepit addresses for providing information on a position on the recording medium are formed on the address regions. Moreover, the present invention provides an optical information recording medium including n recording layers (where n is an integer of at least 2), and in at least the first recording layer to the (n-1)th recording layer from the transparent substrate side, no pair of adjacent address regions in the radial direction of the disk are arranged so as to be aligned on a straight line passing through the center of the disk.

9 Claims, 14 Drawing Sheets

U.S. PATENT DOCUMENTS

| | | | |
|---|---|---|---|
| 5,818,812 A | 10/1998 | Moribe et al. | |
| 5,852,599 A | 12/1998 | Fuji | |
| 5,883,958 A | 3/1999 | Ishiguro et al. | |
| 5,936,933 A | 8/1999 | Miyamoto et al. | |
| 6,002,655 A | * 12/1999 | Ono et al. | 369/44.27 |
| 6,052,465 A | 4/2000 | Gotoh et al. | |
| 6,266,299 B1 | 7/2001 | Oshima et al. | |

FOREIGN PATENT DOCUMENTS

| | | |
|---|---|---|
| EP | 0 802 527 | 10/1997 |
| EP | 1 152 402 A1 | 11/2001 |
| JP | 2-301020 | 12/1990 |
| JP | 3-219440 | 9/1991 |
| JP | 5-314538 | 11/1993 |
| JP | 6-176404 | 6/1994 |
| JP | 6-309673 | 11/1994 |
| JP | 6-338066 | 12/1994 |
| JP | 9-73666 | 3/1997 |
| JP | 9-91781 | 4/1997 |
| JP | 9-97216 | 4/1997 |
| JP | 9-120584 | 5/1997 |
| JP | 9-259438 | 10/1997 |
| JP | 9-265633 | 10/1997 |
| JP | 9-306144 | 11/1997 |
| JP | 10-65662 | 3/1998 |
| JP | 10-83567 | 3/1998 |
| JP | 10-188280 | 7/1998 |
| JP | 11-162031 | 9/1998 |
| JP | 10-233019 | 6/1999 |
| WO | 98/58368 | 12/1998 |
| WO | 01/6502 A1 | 1/2001 |

* cited by examiner

OPTICAL INFORMATION RECORDING MEDIUM, AND METHOD AND APPARATUS FOR RECORDING/REPRODUCING INFORMATION THEREON

"This application is a divisional of application Ser. No. 09/812,533, filed Mar. 20, 2001 now U.S. Pat. No. 6,754,143, which application(s) are incorporated herein by reference."

BACKGROUND OF THE INVENTION

1. Field of the Invention

The present invention relates to an optical information recording medium for recording/reproducing information by irradiation of laser light, and further relates to a method and an apparatus for recording/reproducing information on this medium.

2. Description of the Prior Art

Optical information media have been noted widely as a large capacity and high density memory, and erasable media that can be rewritten have been under development at present. In one of the erasable optical information recording media, a recording layer made of a phase change material that changes between an amorphous state and a crystalline state is formed on a substrate, and information is recorded and erased by irradiating the recording layer with laser light.

An alloy film comprising Ge, Sb, Te, or In as the main components such as a GeSbTe alloy is known as a phase change material for the recording layer. Information is recorded by making the recording layer partially amorphous to form recording marks. The recording layer is made amorphous by heating the recording layer to the melting point or more and cooling it. The recording layer is made crystalline by heating the recording layer to the crystallization temperature or more and not more than the melting point. The reflectance and the transmittance of the irradiated laser light in a region in which a recording mark is formed are different from those in other regions.

In general, spiral or concentric circular guide grooves that are tracked by laser light for recording/reproducing information previously are provided on a substrate. Regions between the grooves are called lands. In recordable CDs (CD-R) or minidisks (MD), either grooves or lands are used as information tracks to record information on, and the other is used as a guard band for separating adjacent information tracks.

In recent years, with improvement of the processing ability of various information equipment, the amount of information to be handled has increased. For this reason, there is a great demand for recording media with a larger capacity than ever. As one approach to achieve larger capacity, in DVD-RAMs or the like, a method for increasing track density by recording information on both grooves and lands is adopted (land & groove recording method).

In DVD-RAMs, a format structure called a ZCLV (Zoned Constant Liner Velocity) method is adopted. In this format structure, an information track is segmented into a large number of information recording regions (sectors) by addresses indicating the position on the medium. Further, several information recording regions are grouped in the radial direction to form a zone. The number of sectors corresponding to one rotation and the rotation speed are increased step by step by each zone from the inner circumference to the outer circumference. In each zone, the rotation speed is constant, and the linear velocity and the duration of a sector are substantially constant between the zones.

On the other hand, in CD-Rs or MDs, a CLV (Constant Liner Velocity) method is used in which information is recorded/reproduced at a constant linear velocity throughout the recording regions. This method can achieve the maximum recording density, and has an advantage in that the design of the recording layer is easy because the thermal conditions during recording are constant.

In the CLV method, it is necessary to change the rotation speed frequently for random access. For this change, the grooves are wobbled in the radial direction at a constant spatial frequency, and a rotating motor of a recording/reproducing apparatus is controlled based on signals obtained from these wobbles for recording/reproducing information. However, the length of a groove for one rotation is varied with the position in the radial direction, so that a phase difference occurs between the wobbles in the adjacent grooves. Therefore, when the land & groove recording method is used with the CLV method, signals are synthesized from wobbles having different phases in the land portion. Thus, good circuit control signals cannot be obtained.

In order to solve this problem, JP 6-338066 has proposed a recording medium in which only one edge of a groove is wobbled. In this recording medium, address information is recorded as a signal that has been frequency-modulated, using a rotation control signal as the carrier frequency.

However, when a gap between information tracks (track pitch) is narrowed to achieve higher density, the ratio of the variation of the information track width is increased, if the amplitude of the wobble is unchanged. Therefore, the signal amplitude is varied during reproduction of information, so that signal quality is deteriorated. On the other hand, when the amplitude of the wobble is reduced as well, the intensity of the signal obtained from the wobble is reduced, which makes it difficult to detect address information.

Furthermore, as another approach to achieve higher density information recording, multilayered recording media including at least two recording layers are proposed. In many multilayered recording media, it is necessary to record/reproduce information with laser light that has passed through another recording layer. Furthermore, it may be necessary to record information successively on a plurality of recording layers, or reproduce information continuously from a plurality of recording layers.

SUMMARY OF THE INVENTION

Therefore, with the foregoing in mind, it is an object of the present invention to provide an optical information recording medium with a large capacity that can achieve easy and reliable recording/reproduction of information. More specifically, first, it is an object of the present invention to provide an optical information recording medium that can achieve easy detection of address information while using the land & groove recording method and the CLV method. Secondly, it is another object of the present invention to provide an optical information recording medium that allows stable recording/reproduction of information even when the recording medium includes two or more recording layers, and information is recorded/reproduced on/from a recording layer with laser light that has passed through another recording layer. Thirdly, it is another object of the present invention to provide an optical information recording medium that can achieve efficient and reliable recording/reproduction of information even when information is recorded/reproduced successively and continuously on/from a plurality of recording layers.

A first optical information recording medium of the present invention includes a disk-shaped transparent substrate and a recording layer for recording, reproducing or erasing information by irradiation of laser light. The recording layer is formed over the substrate, wherein the recording layer comprises information tracks including groove tracks and land tracks that are formed alternately in a radial direction of the disk. The information tracks comprise information recording regions and address regions interposed between the information recording regions. The information recording regions and the address regions are arranged along the tracking direction of the laser light. In the information recording regions, every second step in the radial direction of steps for dividing the groove tracks from the land tracks adjacent to the groove tracks is wobbled in the tracking direction, and in a range whose ends are defined by the address regions the every second step is wobbled at a constant frequency, and prepit addresses for providing information on a position on the recording medium are formed in the address regions.

The first recording medium of the present invention makes it possible to detect the address information reliably when the CLV method is used together with the land & groove method, so that the present invention allows stable recording/reproduction of information.

The present invention also provides a method for recording/reproducing information on the first optical information recording. In this method, information is recorded, reproduced or erased at a constant linear velocity in all the information recording regions while controlling a rotation speed of the recording medium with a rotation control signal obtained from the wobbled steps.

One embodiment of a second optical information recording medium of the present invention includes n recording layers (where n is an integer of at least 2), wherein the recording layers comprise information tracks. The information tracks comprise information recording regions and address regions interposed between the information recording regions. The information recording regions and the address regions are arranged along the tracking direction of the laser light. Prepit addresses for providing information on a position on the recording medium are formed on the address regions, and in at least the first recording layer to the (n-1)th recording layer from the transparent substrate side, no pair of adjacent address regions in the radial direction of the disk are arranged so as to be aligned on a straight line passing through the center of the disk.

Another embodiment of the second optical information recording medium includes a disk-shaped transparent substrate and n recording layers (where n is an integer of at least 2) for recording, reproducing or erasing information by irradiation of laser light. The recording layer is formed over the substrate, wherein the recording layers comprise information tracks including groove tracks and land tracks that are formed alternately in a radial direction of the disk. The information tracks comprise information recording regions and address regions interposed between the information recording regions. The information recording regions and the address regions are arranged along the tracking direction of the laser light. Prepit addresses for providing information on a position on the recording medium are formed on the address regions. A pair of adjacent information tracks in the radial direction of the disk have a common address region on which a common prepit address is formed, and in at least the first recording layer to the (n-1)th recording layer from the transparent substrate side, no pair of adjacent common address regions in the radial direction are arranged so as to be aligned on a straight line passing through the center of the disk.

The second recording medium allows stable recording/reproduction of information, even when information is recorded/reproduced with laser light that has passed through another recording layer. In this medium, even if the transmittance of the laser light is different between the information recording regions and the address regions, the address regions do not form a block but are dispersed. Therefore, transmitted laser light hardly affects the recording layer. The difference in the transmittance of the laser light is made typically by formation of recording marks on the information recording regions.

The present invention also provides a method and an apparatus for recording/reproducing information suitable for the second optical information recording medium. This method is a recording/reproducing method for an optical information recording medium for recording, reproducing or erasing information by irradiating an optical information recording medium with laser light, including detecting reflected light obtained by irradiating the recording medium with the laser light by a photodetector including two light-receiving portions divided in a direction corresponding to a tracking direction of the laser light; generating a sum signal and a difference signal of electrical signals output from the two light-receiving portions; generating a corrected sum signal obtained by correcting an amplitude variation of the sum signal with the difference signal; and generating data information from the corrected sum signal, thereby reproducing the information.

Furthermore, this apparatus is a recording/reproducing apparatus for an optical information recording medium for recording, reproducing or erasing information by irradiating an optical information recording medium with laser light, including an optical head for outputting reproduction signals of the information based on reflected light obtained by irradiating the recording medium with the laser light. The optical head includes a photodetector including two light-receiving portions divided in a direction corresponding to a tracking direction of the laser light; an addition amplifier for generating a sum signal of electrical signals output from the two light-receiving portions; a differential amplifier for generating a difference signal of electrical signals output from the two light-receiving portions; a waveform correcting circuit for generating a corrected sum signal obtained by correcting an amplitude variation of the sum signal with the difference signal; and a data demodulating circuit for reproducing the information by generating data information from the corrected sum signal.

The above-described recording/reproducing method and apparatus are effective for an optical information recording medium in which no pair of adjacent address regions or adjacent common address regions are formed so as to be aligned on a straight line passing through the center of the disk, such as the second optical information recording medium of the present invention, regardless of the number of the recording layers.

A third optical information recording medium of the present invention includes a disk-shaped transparent substrate and n recording layers (where n is an integer of at least 2) for recording, reproducing or erasing information by irradiation of laser light. The recording layers are formed over the substrate, and include a first recording layer and a second recording layer, the first recording layer including a first information track for guiding the laser light from an inner disk circumference side to an outer disk circumference side by rotation of the disk in a predetermined direction, and the second recording layer including a second information track for guiding the laser light from an outer disk circumference side to an inner disk circumference side by rotation of the disk in the predetermined direction.

The present invention also provides a method for recording/reproducing information on the third optical information recording medium. This method is a method for recording, reproducing or erasing information by irradiating the third optical information recording medium with laser light, wherein when in either one recording layer selected from the first recording layer and the second recording layer, recording, reproducing or erasing information on either one information track selected from the first information track and the second information track ends at either one end selected from an inner circumferential end and an outer circumferential end of the one information track, subsequently in the other recording layer, recording, reproducing or erasing information is performed in succession from the corresponding end in the other track.

This and other advantages of the present invention will become apparent to those skilled in the art upon reading and understanding the following detailed description with reference to the accompanying figures.

BRIEF DESCRIPTION OF THE DRAWINGS

FIG. 19A is a diagram showing an example of a sum signal of electrical signals obtained from two light-receiving portions. FIG. 19B is a diagram showing an example of a difference signal of the electrical signals. FIG. 19C is a diagram showing an example of a sum signal corrected with the difference signal (corrected sum signal).

DETAILED DESCRIPTION OF THE INVENTION

Hereinafter, optical information recording media of the present invention will be described with reference to the accompanying drawings.

First Embodiment

Figure 1:
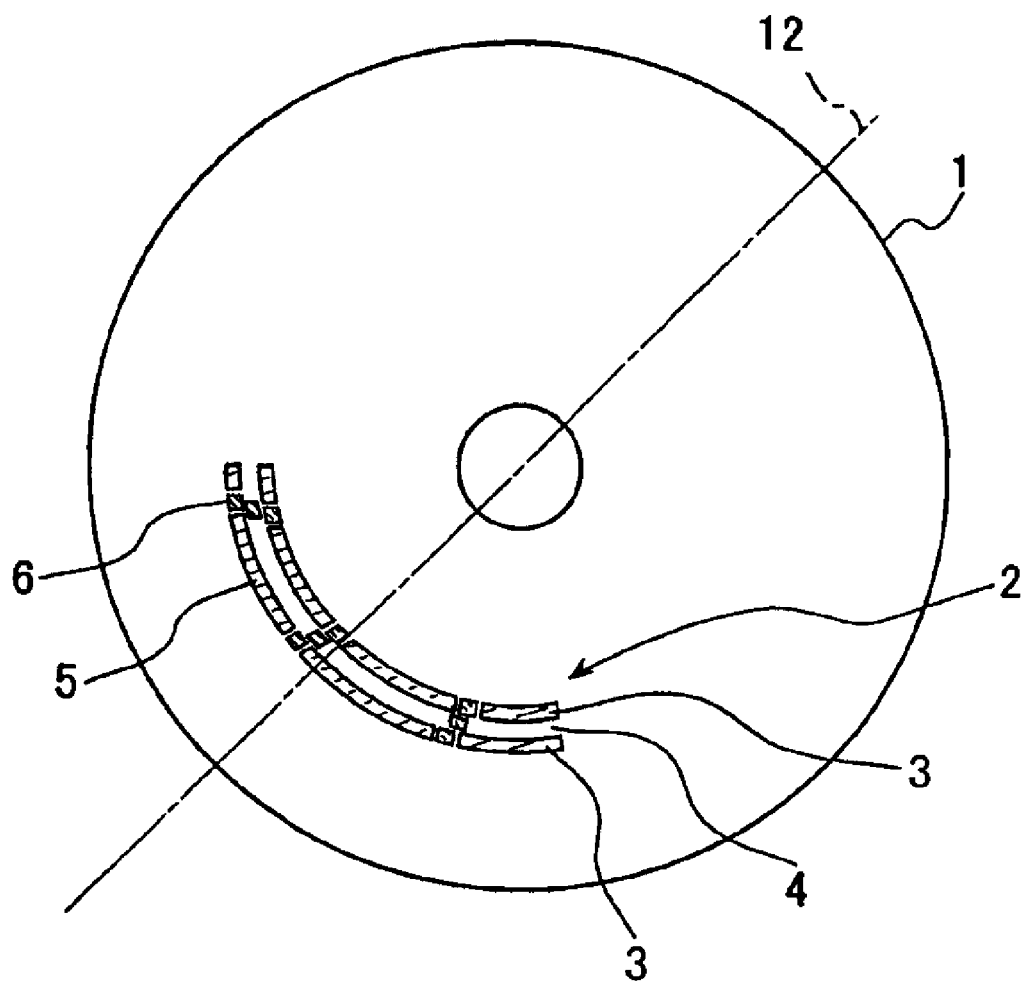
FIG. 1 is a plan view of an embodiment of an optical information recording medium of the present invention.

An optical information recording medium of the present invention includes a recording layer (not shown) on a transparent substrate 1 having a thickness, for example, of 0.6 mm. The substrate 1 is formed of polycarbonate or the like and is provided with a circular center hole in its center with which the substrate is mounted on a recording/reproducing apparatus, as shown in FIG. 1. The recording layer is formed, for example, of a GeSbTe alloy, which is a phase change recording material. In many cases, the recording layer formed of such a phase change recording material is initialized (crystallized) for use. The recording layer is made amorphous locally by irradiation of laser light to form recording marks. The substrate 1 previously is provided with a spiral information track 2 that is tracked by laser light during recording/reproduction and on which information is recorded. The information track 2 includes grooves 3 and lands 4 that are formed alternately in the radial direction of the disk for the land & groove recording method.

Figure 2:
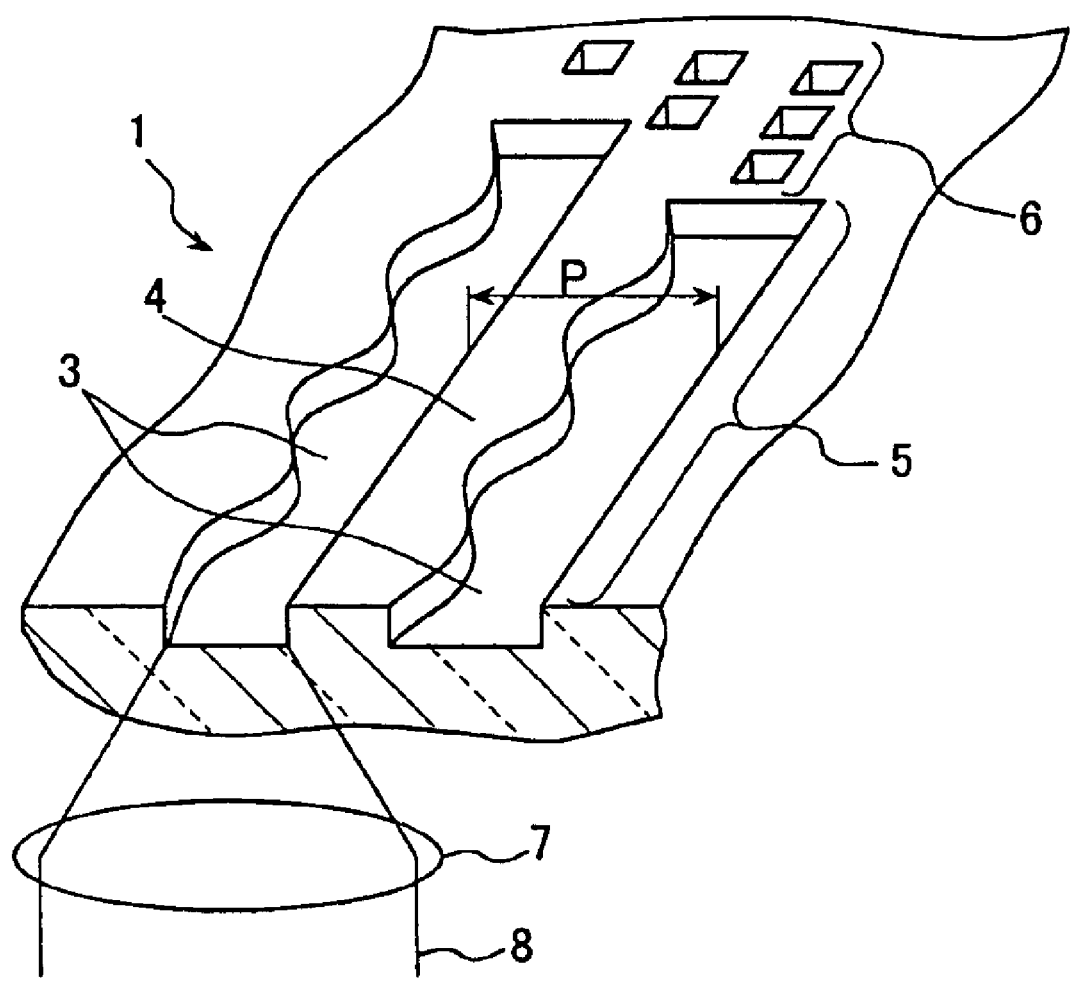
FIG. 2 is a partial perspective view showing an example of an enlarged surface of the recording medium of FIG. 1.

As shown in FIG. 2, laser light 8 is focused on the information track 2 with an objective lens 7 of a recording/reproducing apparatus. The laser light 8 is irradiated from the lower portion of the FIG. 2, that is, after passing through the substrate.

Figure 3:
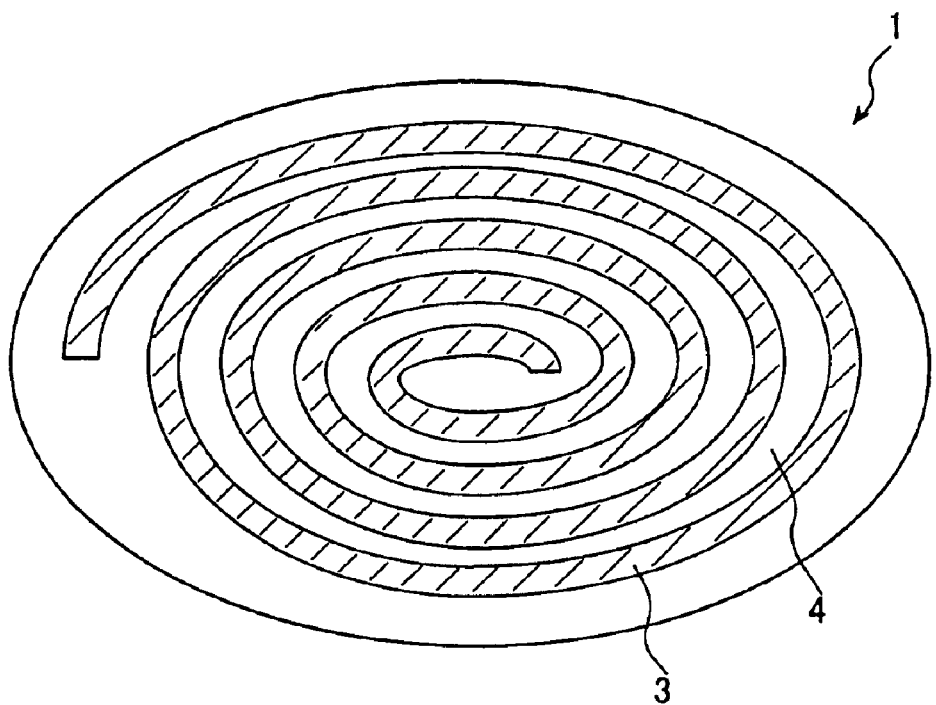
FIG. 3 is a perspective view showing an example of a spiral of an information track in the optical information recording medium of the present invention.

As shown in FIG. 3, the information track 2 is of a double spiral structure in which the grooves 3 and the lands 4 form independent spirals from each other. In the information track 2, information recording regions 5 and address regions 6 are arranged alternately in the circumferential direction of the disk (the tracking direction of laser light). In other words, the information track 2 has a sector format structure in which the information track 2 is segmented into a large number of regions by the address regions 6.

Information can be recorded and reproduced on this optical information recording medium by irradiating the medium with laser light having a wavelength of about 400 nm and condensed mainly by an objective lens having a NA of about 0.65, for example. The groove 3 is a recess formed on the substrate 1 having, for example, a depth of about 40 nm and a width of about 0.35 μm. The land 4 is a protrusion having a width, for example, of about 0.35 μm that remains between the grooves.

One of two edges (step portion) formed along both ends of the groove 3 is wobbled at a constant spatial frequency (in other words, at a constant cycle along the tracking direction of the laser light). On the other hand, the other edge is not wobbled. The spatial frequency is set to be constant within at least the same information recording region 5. With this configuration, only the wobble of one of the grooves adjacent to the land 4 is detected. Therefore, even if the phases of the adjacent wobbles are dislocated, an adverse effect of the wobbles on the signals for rotation control can be reduced.

In this recording medium, the address region 6 is constituted by embossed pits formed on the groove 3 and the land 4. Therefore, even if the track pitch is reduced, address information with a sufficiently large signal intensity can be detected, compared with the medium in which address information is provided by frequency modulation of the wobbles.

Thus, in the optical information recording medium, signals can be detected from stable wobbles in the land as well as the groove, so that stable rotation control can be achieved, and reliable detection of address information also can be achieved. These effects are particularly significant in the case where the track pitch (P in FIG. 2) is small, for example, 0.4 μm or less.

It is preferable that the address regions 6 are formed at a substantially constant interval in the circumferential direction along the information track (in other words, the length in the circumferential direction of each information recording region is substantially uniform) in order to equalize the capacity of each sector for recording/reproducing by the CLV method.

As shown in FIG. 1, in the recording medium having a double spiral structure, a method for recording the information on either the land tracks or the groove tracks and then recording the information on the other tracks later is advantageous, particularly for recording animation information for a long time, because an access operation can be eliminated during recording and reproduction. However, when the track pitch is small, in some optical systems of recording apparatuses or recording conditions, adjacent erase (cross erase) occurs where recording marks of information track that have been recorded earlier are shrunk by heat energy transferred from the information track for recording later, so that signal quality may deteriorate.

When the adjacent erase is predicted, it is preferable to compare the land track and the groove track and to record information first on the track that provides a larger signal amplitude in view of the relationship between the optical nature of the recording layer and the groove shape of the information track. According to this preferable example, even if signal quality is deteriorated by the adjacent erase, the signal intensity of the information track used for earlier recording can be at a sufficient level for demodulation. Thus, reproduction errors can be suppressed. Alternatively, the width of the track for earlier recording can be made wider than that of the track for later recording to suppress the deterioration of the signal quality due to the adjacent erase.

Figure 4:
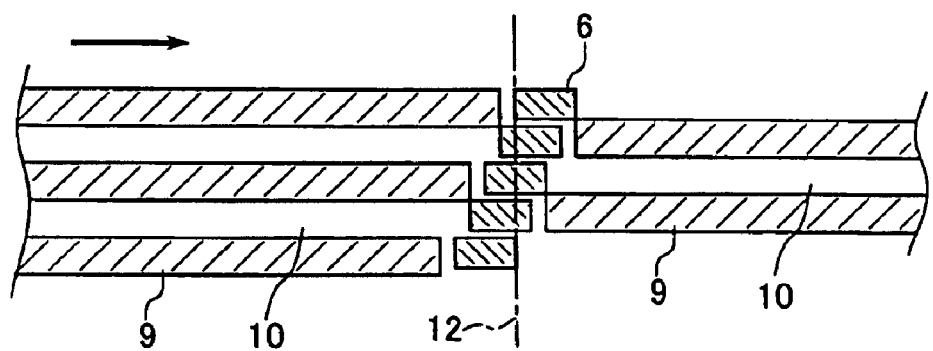
FIG. 4 is a plan view showing switched portions of an information track of the optical information recording medium of FIG. 3.

In the recording medium, the information track is of a double spiral structure. However, the structure is not limited thereto, and for example, a single spiral structure in which a spiral is formed while switching the land and the groove about by every one rotation can be used. In this case, the address regions 6 can be formed as shown in FIG. 4. The single spiral structure of this form has an advantage, because this makes it easy to record/reproduce information continuously throughout the recording regions in the medium, using the CLV method as well as the land & groove recording method.

When the edges of the grooves are wobbled, the groove width and the land width are changed, and this change may affect reproduction signals. If it is necessary to eliminate this adverse effect, it is preferable that the frequency of the wobbles falls within the control band of a data demodulation circuit of a recording/reproducing apparatus used for the recording medium. When the information is corrected by the data demodulation circuit with the frequency of the wobbles, the data recorded in the recording medium can be demodulated more reliably.

In the above example, the thickness of the transparent substrate is about 0.6 mm and the width of the groove track is about 0.35 μm on the assumption that an apparatus including an objective lens of a NA of about 0.65 and laser light of a wavelength of about 400 nm is used. However, this is only illustrative, and the values are not limited thereto. For example, when it is assumed to use an apparatus including an objective lens of a NA of about 0.85 and laser light of a wavelength of about 400 nm, for example, the thickness of the transparent substrate can be about 0.1 mm and the width of the groove track can be about 0.3 μm. The depth of the groove track can be adjusted as appropriate.

As shown in FIGS. 1 and 4, it is preferable that the address regions do not coincide with the straight line 12 that passes through the center of the disk (the straight line including the diameter) in the radial direction of the disk. More specifically, in these media, the address regions adjacent along the radial direction of the disk are arranged so as not to be on the above-described straight line. When the address regions are dispersed in their arrangement in this manner, information can be recorded/reproduced stably, even if information is recorded/reproduced on a recording layer by laser light that has passed through another recording layer, the recording layers having a different transmittance in the address regions from that in the information recording regions. This point will be described in Embodiment 2.

Emodiment 2

Figure 5:
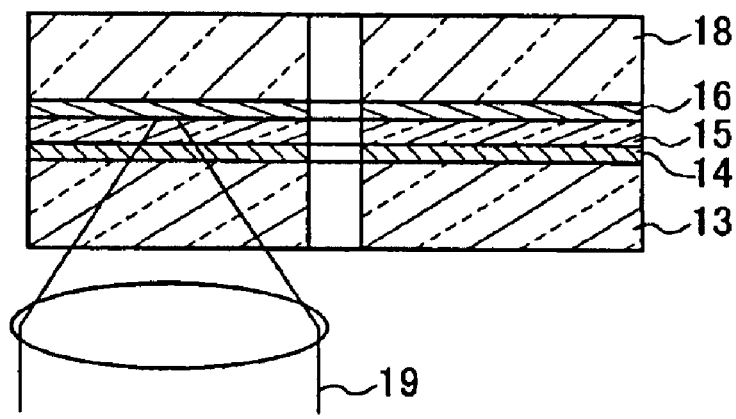
FIG. 5 is a cross-sectional view of another embodiment of the optical information recording medium of the present invention.

As shown in FIG. 5, an optical information recording medium of this embodiment includes a one-sided two layered structure including two recording layers 14 and 16, and information is recorded, reproduced or erased on/from the recording layers by irradiating the recording layers with laser light 19 from a substrate 13 side and focusing the light on the first recording layer 14 or the second recording layer 16. The recording layers 14 and 16 are separated from each other by a separating layer 15. These layers 14, 15, and 16 are interposed between the substrate 13 and a protective plate 18.

As shown in FIGS. 1 and 4, at least in the first recording layer 14, the address regions adjacent along the radial direction of the disk are arranged so as not to be on the straight line that passes through the center of the disk. Such an arrangement prevents the angular positions of the address regions when viewed from the disk center from being coincided with each other in the adjacent information tracks. For this reason, the address regions are not arranged in the same angular position in the same zone, unlike the case where the ZCLV is used.

When the address regions are arranged so as not to form a block in this manner, a local change in the light amount of the laser light that passes through the first recording layer 14 can be suppressed, even if the first recording layer 14 is formed of a recording layer having a different transmittance of laser light in the address regions from that in the information recording regions, typically, a material that allows a change in the transmittance of laser light due to formation of recording marks. Therefore, a local influence on the reproduction signal level from the second recording layer 16 advantageously can be reduced.

For example when the first recording layer 14 is formed of a material that allows a reduction of the transmittance by recording information, the transmittance of laser light in the address regions is higher than that in the information recording regions in which recording marks are formed. On the other hand, when the first recording layer 14 is formed of a material that allows an increase of the transmittance by recording information, the transmittance of laser light in the address regions is lower. However, if the address regions are not concentrated on the region of the first recording layer 14 through which laser light passes, this hardly causes a problem.

Figure 6:
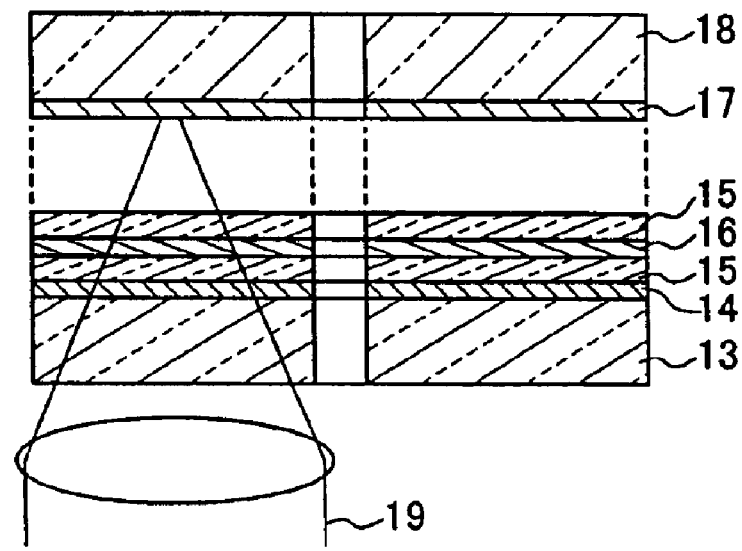
FIG. 6 is a cross-sectional view of yet another embodiment of the optical information recording medium of the present invention.

An effect obtained from the dispersion of the address regions is more significant in an optical information recording medium as shown in FIG. 6, which is provided with n' recording layers (n'≧3) in total. For recording/reproducing information on the n'th recording layer 17, the address regions can be arranged in a non-linear form, as shown in FIGS. 1 and 4, at least in (n-1) recording layers positioned on the laser light incident side than the n'th layer 17. In the recording medium shown in FIG. 6, as the recording medium shown in FIG. 5, the separating layers 15 are disposed between the recording layers, and all the layers are protected by the substrate 13 and the protective layer 18 from both surfaces. However, it is not necessary to form the separating layer between all neighboring recording layers.

In this case, as in Embodiment 1, it is preferable for each recording layer to have the sector format structure in which the information track is segmented into a large number of sectors by the address regions, and it is preferable that the address regions are formed at a substantially constant interval in the circumferential direction so that the capacitor of each sector is equal when recording/reproducing information by the CLV method. Also in this case, in the substrate 13, only one edge of the groove is wobbled at a constant spatial frequency in the information recording regions, and prepit addresses are arranged in the address regions.

Furthermore, in the multi-layered recording media as shown in FIGS. 5 and 6, it is preferable to form recording layers in which the spiral directions of their information tracks are opposite when viewed from a predetermined direction. This is because so-called seamless recording or seamless reproduction can be achieved. This point will be described in Embodiment 3.

Embodiment 3

Figure 7:
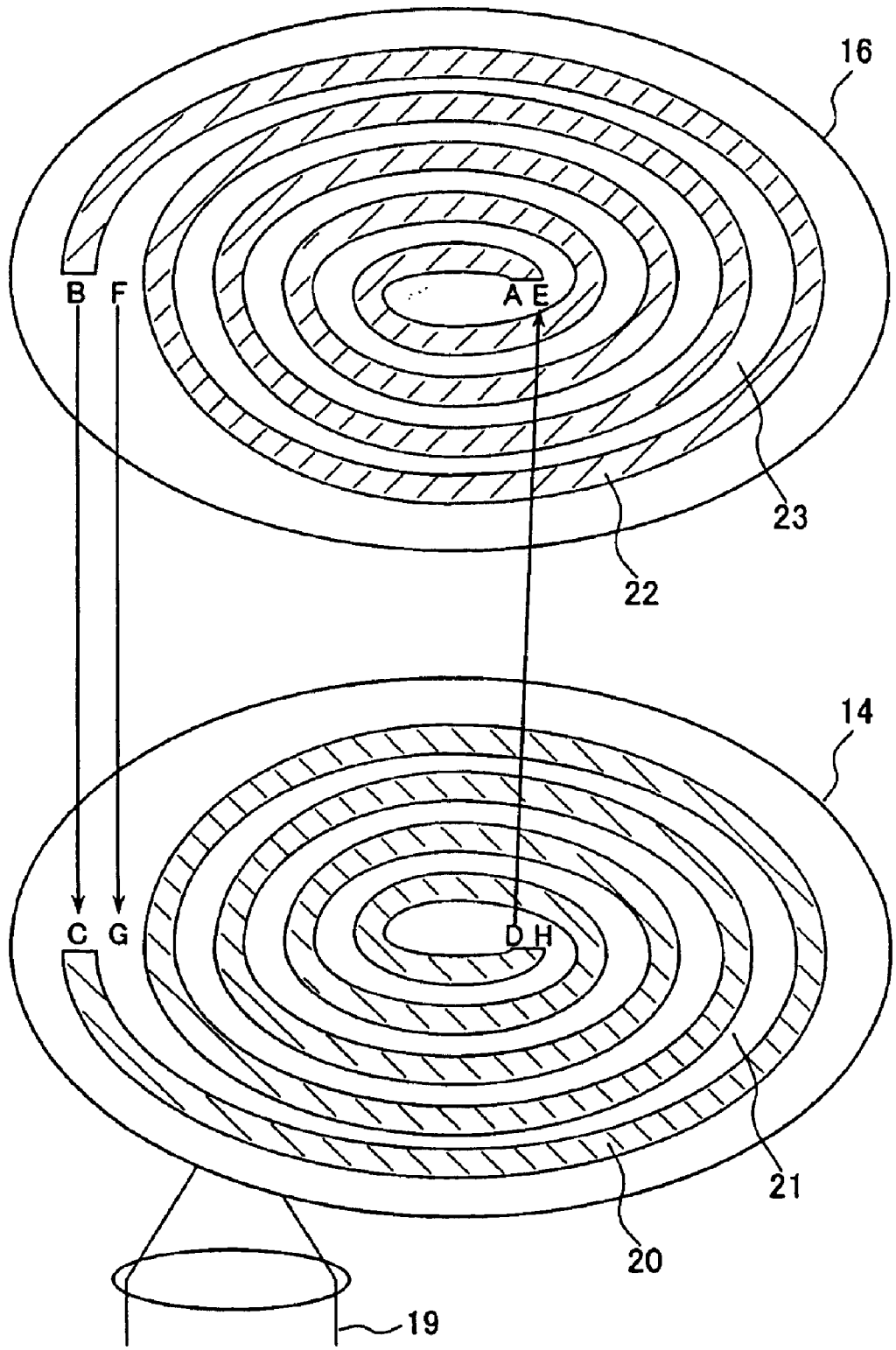
FIG. 7 is a cross-sectional view of still another embodiment of the optical information recording medium of the present invention together with the scanning order of laser light.

In an optical information recording medium of this embodiment, as shown in FIG. 7, the spiral directions of the information tracks of the first recording layer 14 and the second recording layer 16 are opposite to each other when viewed from the laser light 19 incident side. Therefore, seamless recording or seamless reproduction that uses the capacity of the recording medium to the maximum can be achieved by using these two recording layers alternately.

For example, in FIG. 7, information can be recorded (or reproduced) in the following manner. First, the laser light 19 is focused on the second recording layer 16, and information is recorded from an inner circumferential end A of a second groove 22 toward the outer circumference. When the laser light 19 reaches an outer circumferential end B, the laser light is focused on an outer circumferential end C in a first groove 20 of the first recording layer 14. Furthermore, information is recorded toward the inner circumference of the first groove 20, and when laser light reaches an inner circumferential end D, the laser light is focused again on an inner circumferential end E in a second land 23 of the second recording layer 16. Subsequently, information is recorded toward the outer circumference of the second land 23. When the laser light reaches an outer circumferential end F, the laser light 19 is focused on an outer circumferential end G in a first land 21 of the first recording layer 14. Then, information is recorded toward an inner circumferential end H in the first land 21. Herein, the outer circumferential end (inner circumferential end) refers to the outer circumferential end (inner circumferential end) of the region to be used for recording information.

When recording/reproducing information is performed continuously while transferring from one recording layer to another recording layer at the end of the information track, as appropriate, it is not necessary to move an optical head for switching the information tracks while using all the information recording regions of the medium. Therefore, seamless recording and seamless reproduction can be achieved while using the capacity of the recording medium to the maximum.

In order to obtain opposite spiral directions of the information tracks of the recording layers 14 and 16 of the recording medium shown in FIG. 5, for example, the spiral directions of the grooves of the substrate 13 and the protective plate 18 can be made opposite. In this case, the recording layers 14 and 16 are formed on the substrate 13 and the protective plate 18, respectively, and the substrate 13 and the protective plate 18 are attached with a UV curable resin that becomes the separating layer in such a manner that the recording layers face each other. Thus, the recording medium as shown in FIG. 5 can be obtained. The thickness of the separating layer can be, for example, about 40 μm. However, the thickness is not limited thereto, and a groove having a spiral direction opposite to that of the transparent substrate can be formed on the separating layer 15. In this case, for example, the first recording layer 14 and the separating layer 15 can be laminated on the substrate 13 in this order, and an information track can be formed in the separating layer 15 by a 2P(photo-polymerization) method or the like. Then, the second recording layer 16 can be formed thereon, and then the protective layer 18 can be provided.

In the recording medium including at least three recording layers as shown in FIG. 6, if at least one recording layer provided with the information track having a first spiral direction and at least one recording layer provided with the information track having a second spiral direction that is opposite to the first direction are included, the seamless recording (reproduction) in the same level as above can be performed. In the case of at least three recording layers, the number of recording layers (group) having the first spiral direction is equal to the number of recording layers (group) having the second spiral direction, or else the difference in the number of the layers is 1, so that seamless recording (reproduction) using the capacity of the recording medium to the maximum can be performed.

There is no limitation on the order of recording information on the recording layers. However, taking a recording layer of a two layered structure as an example, when the first recording layer has the property that the transmittance of the laser light is increased by recording information, it is preferable to record information on the first recording layer first. On the other hand, when the first recording layer has the property that the transmittance of the laser light is decreased by recording information, it is preferable to record information on the second recording layer first.

In this case, as in Embodiment 1, it is preferable for each recording layer to have the sector format structure in which the information track is segmented into a large number of sectors by the address regions, and it is preferable that the address regions are formed at a substantially constant interval in the circumferential direction so that the capacitor of each sector is equal when recording/reproducing information by the CLV method. Also in this case as in the substrate 1 of Embodiment 1, in the substrate 13, only one edge of the groove is wobbled at a constant spatial frequency in the information recording regions, and prepit addresses are arranged in the address regions.

Embodiment 4

Figure 8:
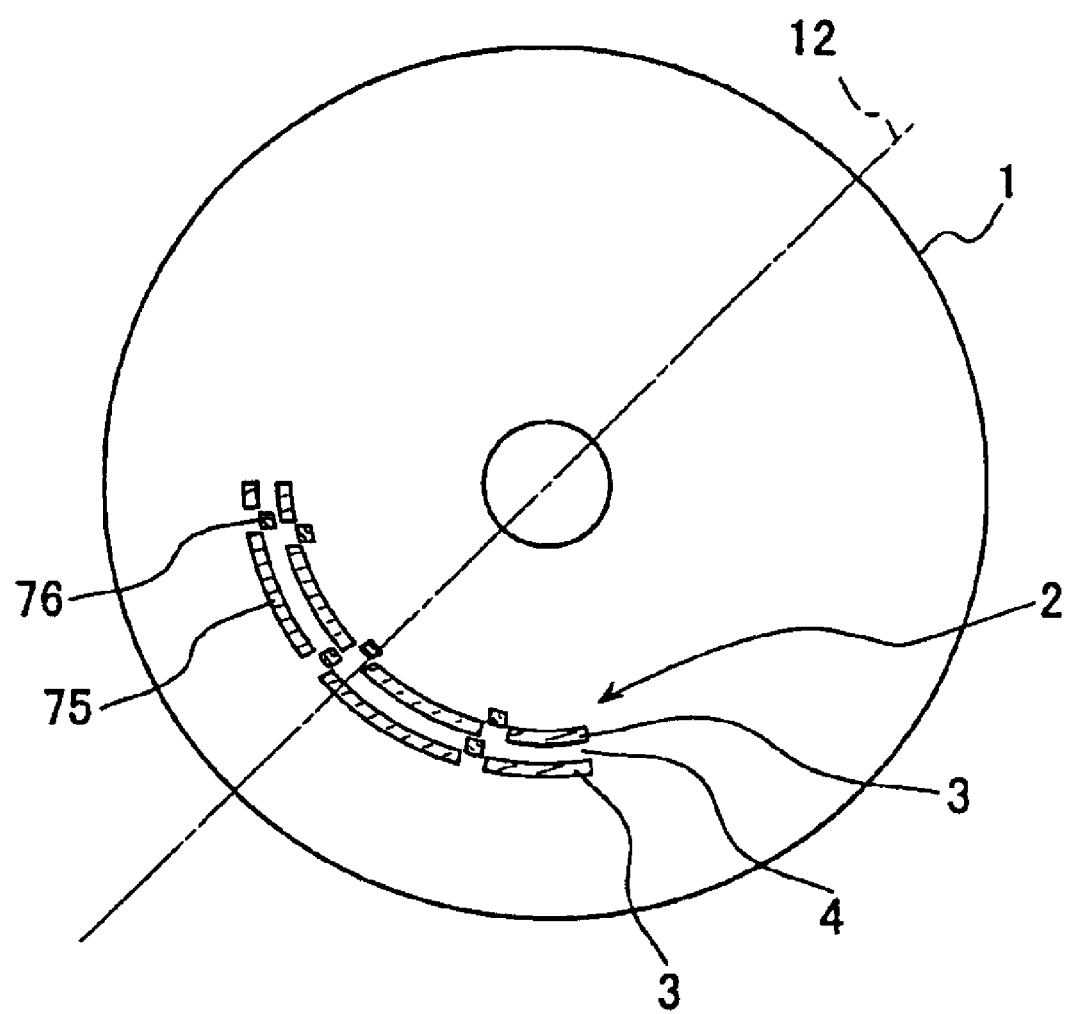
FIG. 8 is a plan view of another embodiment of the optical information recording medium of the present invention.

This embodiment shows a variation of the prepit addresses in the address regions shown in the above embodiments. In the optical information recording medium of this embodiment shown in FIG. 8, as in the recording medium of Embodiment 1 shown in FIG. 1, a recording layer (not shown) is provided on the substrate 1 on which grooves 3 and lands 4 are formed. The recording layer formed on the surfaces of the groove and the land is provided with information tracks 2. The information track 2 has a sector format structure in which information recording regions 75 and address regions 76 are arranged alternately along the radial direction of the disk.

Figure 9:
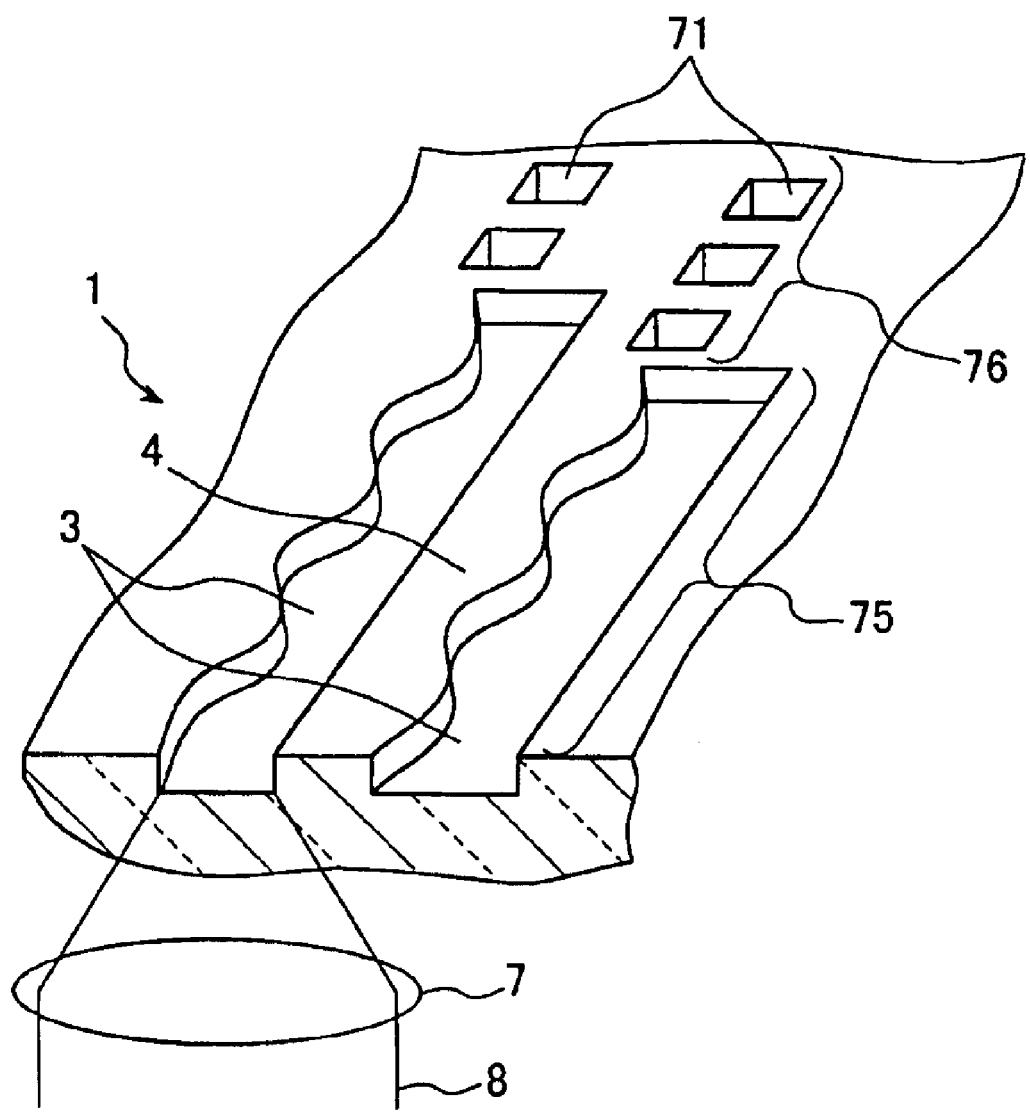
FIG. 9 is a partial perspective view showing an example of an enlarged surface of the recording medium of FIG. 8.

Also in this optical information recording medium, as shown in FIG. 9, only one edge of the groove 3 is wobbled at a constant spatial frequency in the recording regions 75. Since the other edge is not wobbled, the wobbled edges are arranged at every two edges in the radial direction of the disk. In the address regions 76, prepit addresses 71 formed as an embossed pit group are formed. Thus, also in the medium of this embodiment, signals can be detected stably from the wobbles both in the land and the groove, while using the CLV method, so that stable rotation control can be achieved. At the same time, reliable detection of address information can be achieved. In this embodiment as well, it is preferable that the address regions 76 are arranged at a substantially constant interval in the circumferential direction along the information tracks so that the capacity of each sector is equal when recording/reproducing information by the CLV method.

As shown in FIG. 9, in this embodiment, prepit addresses 71 are provided on the extended line of the edge of the groove 3, and the land 4 and the groove 3 that are adjacent via this edge share the prepit addresses 71. The prepit addresses 71 are arranged at an interval equal to the track pitch in the radial direction. The address regions 76 in which common prepit addresses are formed are common address regions with respect to a pair of information tracks that are adjacent in the radial direction of the disk.

If the common prepit addresses 71 are formed so as to straddle the boundary of the pair of information tracks in this manner, the prepits can be made larger than when the prepit addresses are formed for each information track so that the prepits can be formed easily by, for example, injection molding. Furthermore, it is preferable that a pair of information tracks having the common address region share the wobbled step in the information recording region. This makes it possible to form the wobbles in the groove tracks and the land tracks without discontinuation.

Figure 10:
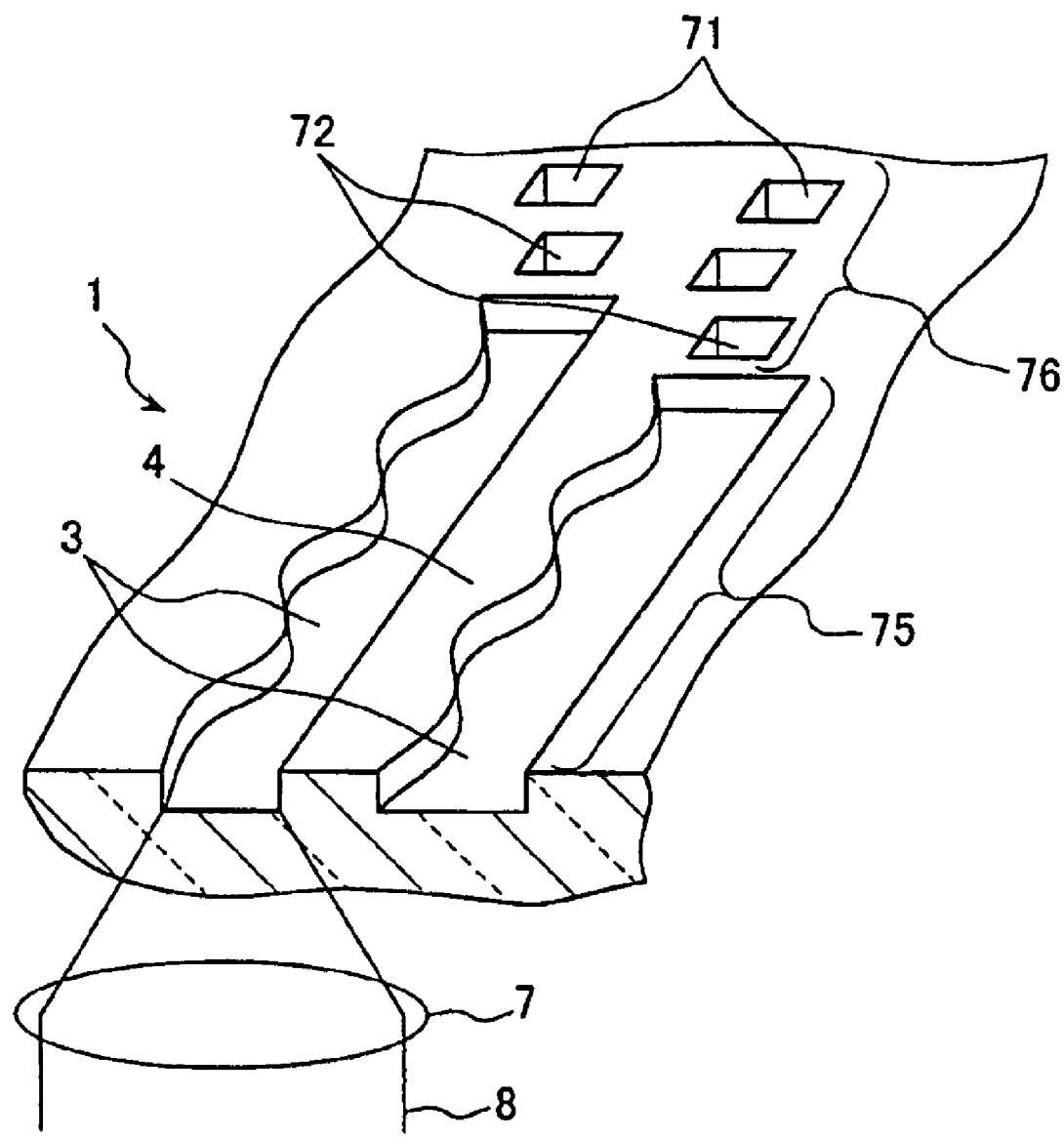
FIG. 10 is a partial perspective view showing another example of an enlarged surface of the recording medium of FIG. 8.

In the case where the prepit addresses common to a pair of a groove track and a land track are formed as shown in FIG. 10, as in this embodiment, it is preferable to form groove-land identifying pits 72 on at least one of the groove track and the land track in the common address regions 76. The groove-land identifying pits 72 shown in FIG. 9 are detected only when information is recorded/reproduced on/from the groove track 3, so that reliable identification of the tracks can be achieved. In this embodiment, the pits 72 are formed only on the groove track 3, but the identifying pits can be formed only on the land track 4 or both tracks. Furthermore, as shown in FIG. 10, it is preferable to form the groove-land identifying pits 72 over the central line extending in the circumferential direction of the track to be identified.

Embodiment 5

In this embodiment, a variation of the groove track and the land track of the above-described embodiments will be described. The optical information recording medium of this embodiment can be used as a recording medium in which the address regions adjacent in the radial direction of the disk are not arranged on the straight line that passes through the disk center.

Figure 11:
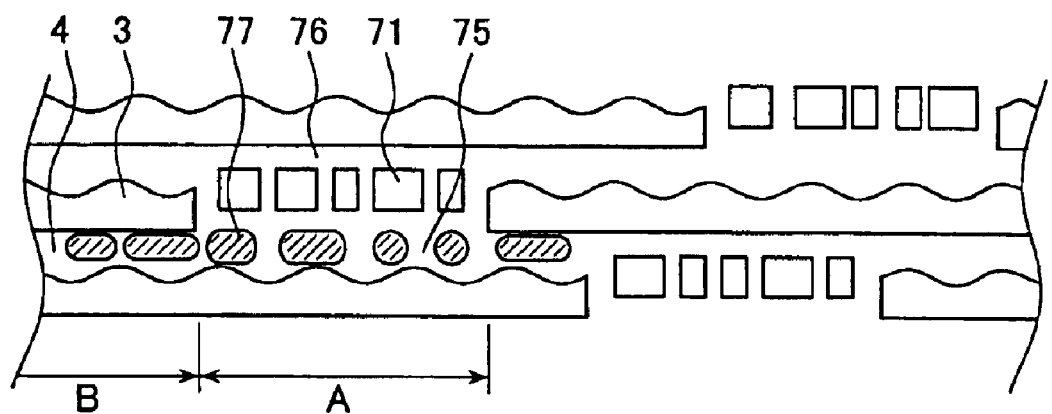
FIG. 11 is a partial plan view showing an example of an arrangement of information recording regions and address regions in the optical information recording medium of the present invention together with recording marks formed in the information recording regions.

In the recording medium in which the address regions are arranged as above, an information region is adjacent to at least a part of the address region. Therefore, as shown in FIG. 11, a recording mark 77 formed on the land track 4 is wider in the radial direction in the portion where the recording mark 77 is adjacent to the address region 76 (region A) than to the other information region 75 (region B). Such a partial enlargement of the recording mark causes distortion of reproduction signals. As shown in FIG. 11, non-uniformity of the recording marks is significant when a pair of adjacent information tracks share the prepit addresses 71.

Figure 12:
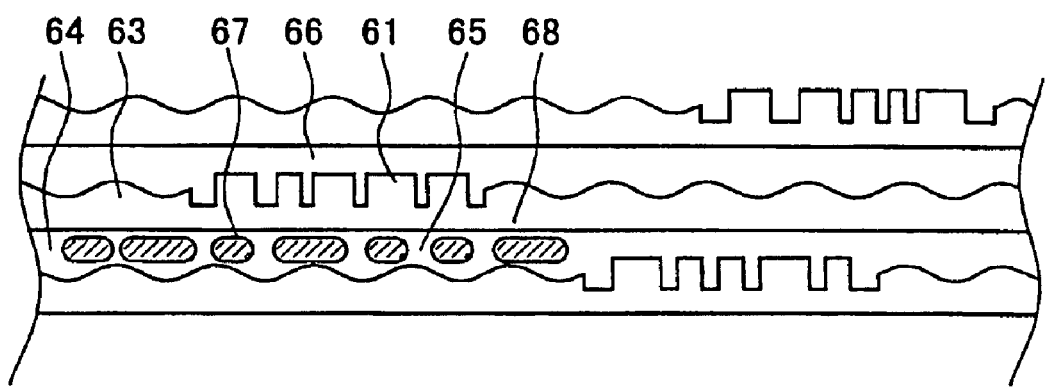
FIG. 12 is a partial plan view showing another example of arrangement of information recording regions and address regions in the optical information recording medium of the present invention together with recording marks formed in the information recording regions.

Therefore, in this embodiment, as shown in FIG. 12, recording mark shaping groove 68 is provided in the address region. The shaping groove 68 allows the address region 66 to have steps that divide the groove 63 from the land 64 at both boundaries between the address region 66 and the two information recording regions 65 adjacent thereto in the radial direction of the disk. Thus, the recording mark 67 can be formed without being enlarged in the portion in which the information recording region is adjacent to the address region, so that distortion of reproduction signals can be suppressed.

As shown in FIG. 12, the recording mark shaping groove 68 can be formed by extending the edge that is not wobbled from the information recording region 65 to the address region 66. As shown in FIG. 12, the shaping groove 68 can be formed to be continuous with the prepit addresses 61.

Embodiment 6

Figure 13:
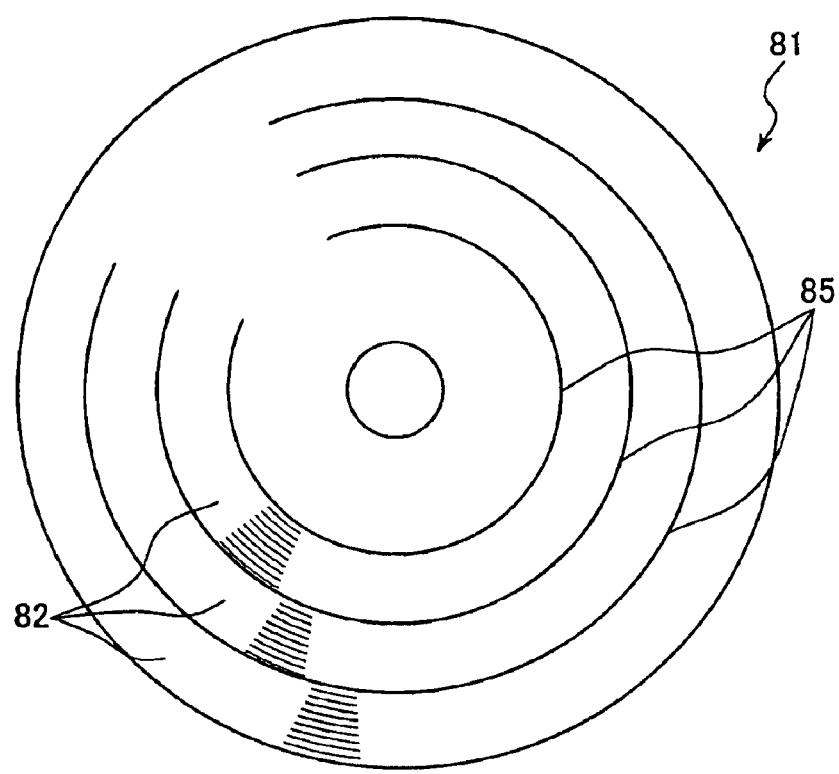
FIG. 13 is a plan view of an optical information recording medium showing an example of an arrangement of tracks for correcting servo conditions.
Figure 14:
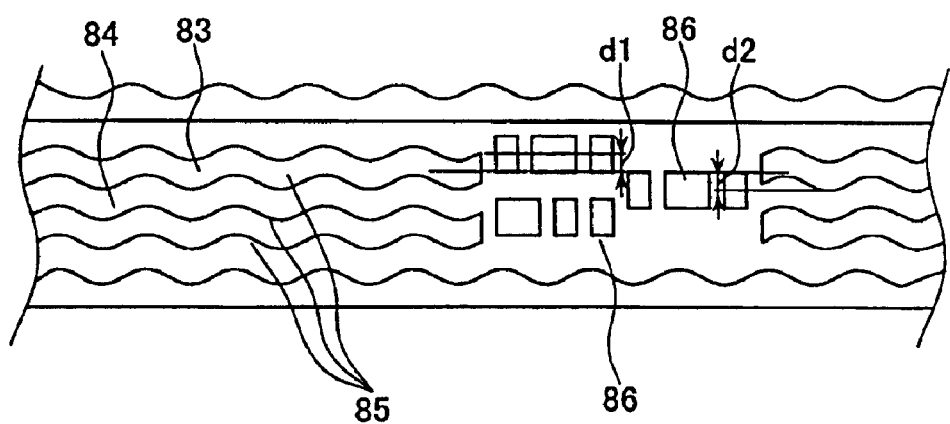
FIG. 14 is a partial plan view showing an example of an enlarged surface of the recording medium of FIG. 13.

In this embodiment, the optical information recording media of the above-described embodiments further provided with a track for correcting servo conditions will be described. In the optical information recording medium of this embodiment, as shown in FIG. 13, a substrate 81 provided with tracks 85 for correcting servo conditions as well as information tracks 82 is used. It is preferable to form the tracks for correcting servo conditions between the information tracks at a constant interval. It is preferable to form pits 86 for correcting servo conditions in the tracks 85 for correcting servo conditions so that the center thereof is positioned equally apart from the centers of the groove 83 and the land 84 in the radial direction (the distances d1 and d2 are equal in FIG. 14). It is preferable that the pits 86 for correcting servo conditions are formed in a staggered arrangement (in a zigzag). For example, it is possible to form groups of three pits each whose center is shifted in alternation with respect to the center of the groove 83 or the land 84, as shown in FIG. 14.

More specifically, the servo conditions include, for example, tracking servo conditions for correcting the dislocation of the laser light scanning the tracks from the track center during recording/reproduction, and tilt servo conditions for correcting the tilt of the laser light for irradiation of the medium. The tracking servo conditions and the tilt servo conditions can be obtained by, for example, using a difference signal of electrical signals output from two light-receiving portions divided in the direction corresponding to the circumferential direction of the recording medium (tracking direction of laser light) when scanning the pits for correcting servo conditions on the tracks for correcting the servo conditions. A recording/reproducing apparatus having the two light-receiving portions will be described later.

It is preferable to provide the track for correcting the servo condition at every radial position range to which the same servo conditions can be applied. The shorter the gap is and the larger the number is, the more reliable the servo conditions are. However, it is preferable that the number is as small as possible so as not to reduce the recording capacity of the medium.

For example, one set of tracks for correcting the servo condition can be provided per 5000 information tracks. When the gap between the information tracks is 0.35 μm, 5000 information tracks corresponds to a length along the radial direction of 1.75 mm. In the case of the recording medium using a substrate having a general thickness of about 0.6 mm, when the difference in the positions in the radial direction is 5 mm or less, a change in the shape that changes the optimal servo conditions significantly does not occur. Therefore, if the tracks for correcting the servo conditions are provided at every 5 mm or less in the radial direction at the above-described frequency, this is sufficient for correcting the servo conditions at each radial position.

In FIG. 14, a set of the tracks for correcting the servo conditions corresponds to three information tracks (corresponds to five information tracks if the tracks before and after are included). In this case, the area of the tracks for correcting the servo conditions is only 0.1% or less of the total recording regions, so that the recording capacity is not substantially reduced. In this embodiment, an example where the tracks for correcting the servo conditions are provided on both the grooves and the lands has been described. However, the tracks for correcting the servo conditions can be provided on either one of them. However, it is advantageous to provide the tracks for correcting the servo conditions on both the groove and the land, because the difference between the grooves and the lands can be compensated so that more reliable correction of the servo conditions can be achieved.

In the drawings referred to for describing the above embodiments, the shapes of the prepits and pits for correcting the address servo conditions are a rectangle in the plan views. However, the shape of the pits is not limited thereto, and for example, the corners of the pits can be rounded, as commonly seen in reality.

Embodiment 7

In this embodiment, an example of a method for producing the optical information recording media of the above embodiments, in particular, a recording medium provided with grooves having an edge that is wobbled at a constant spatial frequency will be described.

Figure 15:
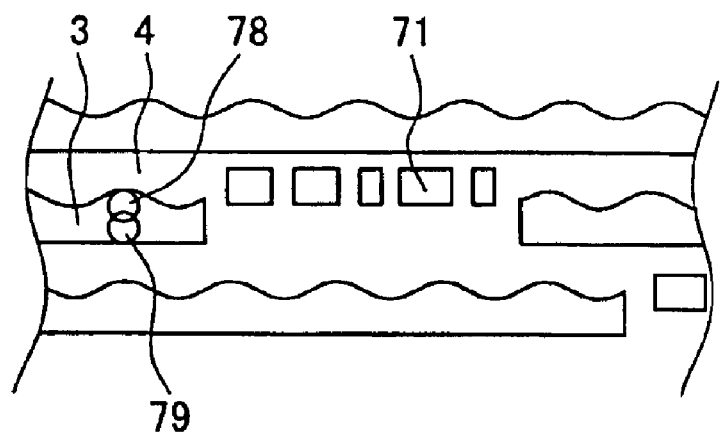
FIG. 15 is a partial plan view showing an example of a stamper production process in a method for producing an optical information recording medium of the present invention.

First, a stamper is prepared in the following manner. A photoresist is applied onto a glass substrate, and is irradiated with laser light so that portions corresponding to grooves and prepit addresses are exposed. For portions corresponding to groove 3, irradiation is performed while moving two laser spots 78 and 79 spirally with respect to the glass substrate, as shown in FIG. 15. Among these spots, one laser spot 78 wobbles in the radial direction of the glass substrate, and the other laser spot 79 is irradiated without wobbling in the radial direction. The wobbled laser spot 78 wobbles while maintaining the state where a part thereof overlaps the other spot 79. To form the prepit addresses 71 in the form shown in FIG. 15, only the laser spot 78 is used for portions corresponding to the prepit addresses, and this spot is displaced in the radial direction. Then, the position corresponding to the boundary between the groove 3 and the land 4 is irradiated with laser light intermittently.

Figure 16:
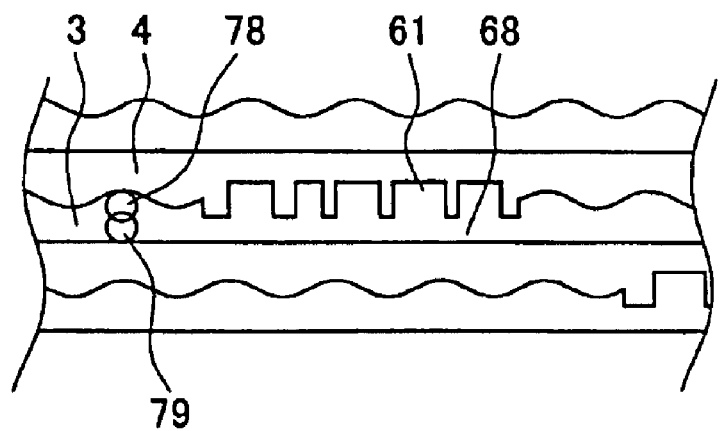
FIG. 16 is a partial plan view showing an other example of a stamper production process in a method for producing an optical information recording medium of the present invention.

Also to form recording shaping grooves 68, a stamper can be prepared in the same manner as above. In this case, as shown in FIG. 16, in the intermittent irradiation of the laser spot 78 to form the prepit addresses 61, irradiation with the laser spot 79 is performed continuously in parallel.

Next, the photoresist exposed to irradiation of the laser light is developed, and a Ni layer is formed on a surface of the photoresist, for example by sputtering and electroforming. The Ni layer is peeled from the glass substrate, and the photoresist is removed, so that a stamper can be obtained. Using this stamper, polycarbonate resin, for example, is injection-molded, so that a substrate provided with the grooves 3 and the prepit addresses 71 as shown in FIG. 15 can be obtained. Furthermore, a recording layer is formed on the surface on which the grooves 3 and the like are formed by a commonly used method (e.g., sputtering), and a protective layer formed of, for example, a UV curable resin is formed. Thus, an optical information recording medium can be obtained. In the specification of the present invention, a protective layer, a reflective layer or the like that can be formed on both surfaces of the recording layer as appropriate are not discussed herein. However, these layers can be formed by sputtering or the like, if necessary.

Embodiment 8

In this embodiment, an apparatus and a method for recording/reproducing information will be described.

Figure 17:
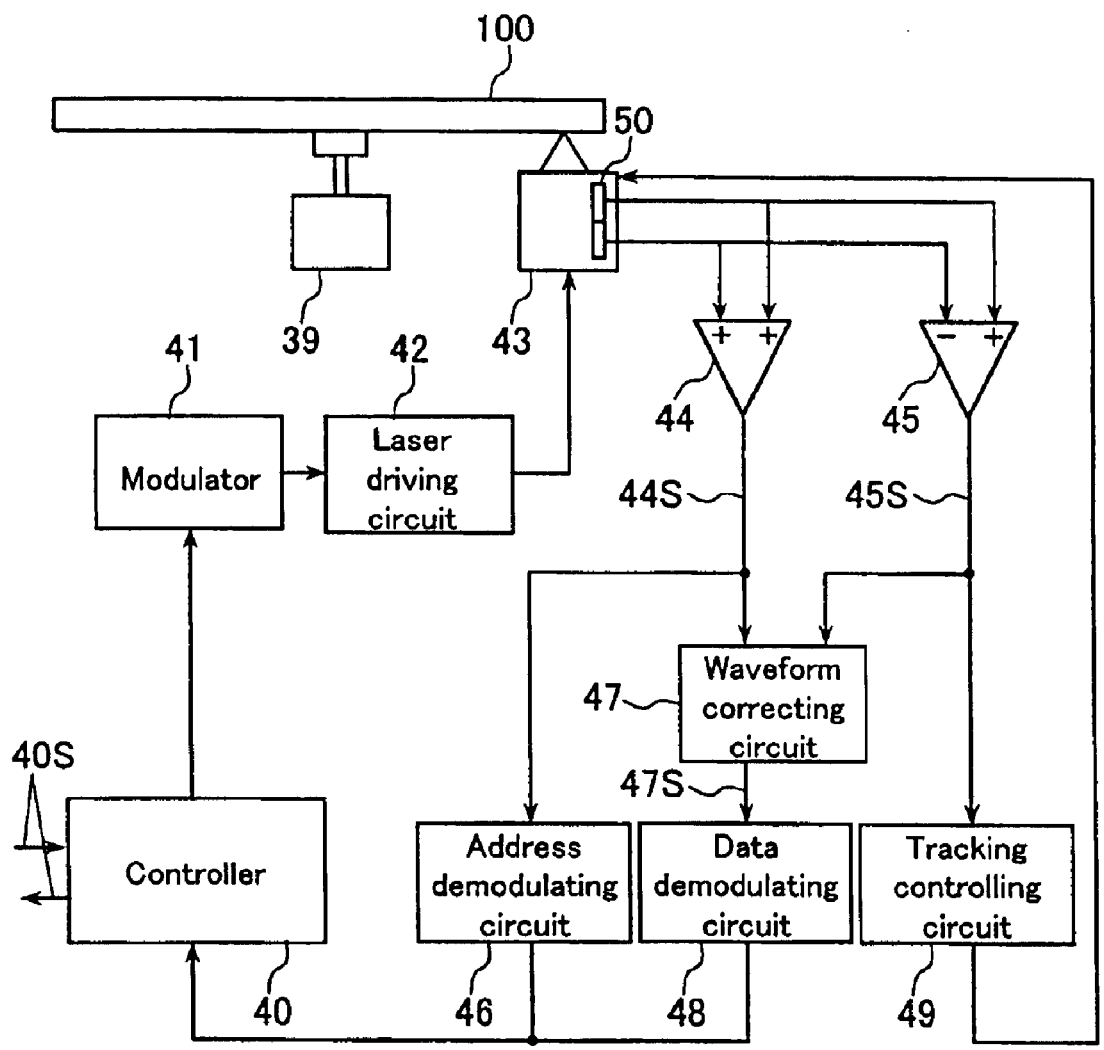
FIG. 17 is a configuration diagram showing an example of a recording/reproducing apparatus for the optical information recording medium of the present invention.
Figure 18:
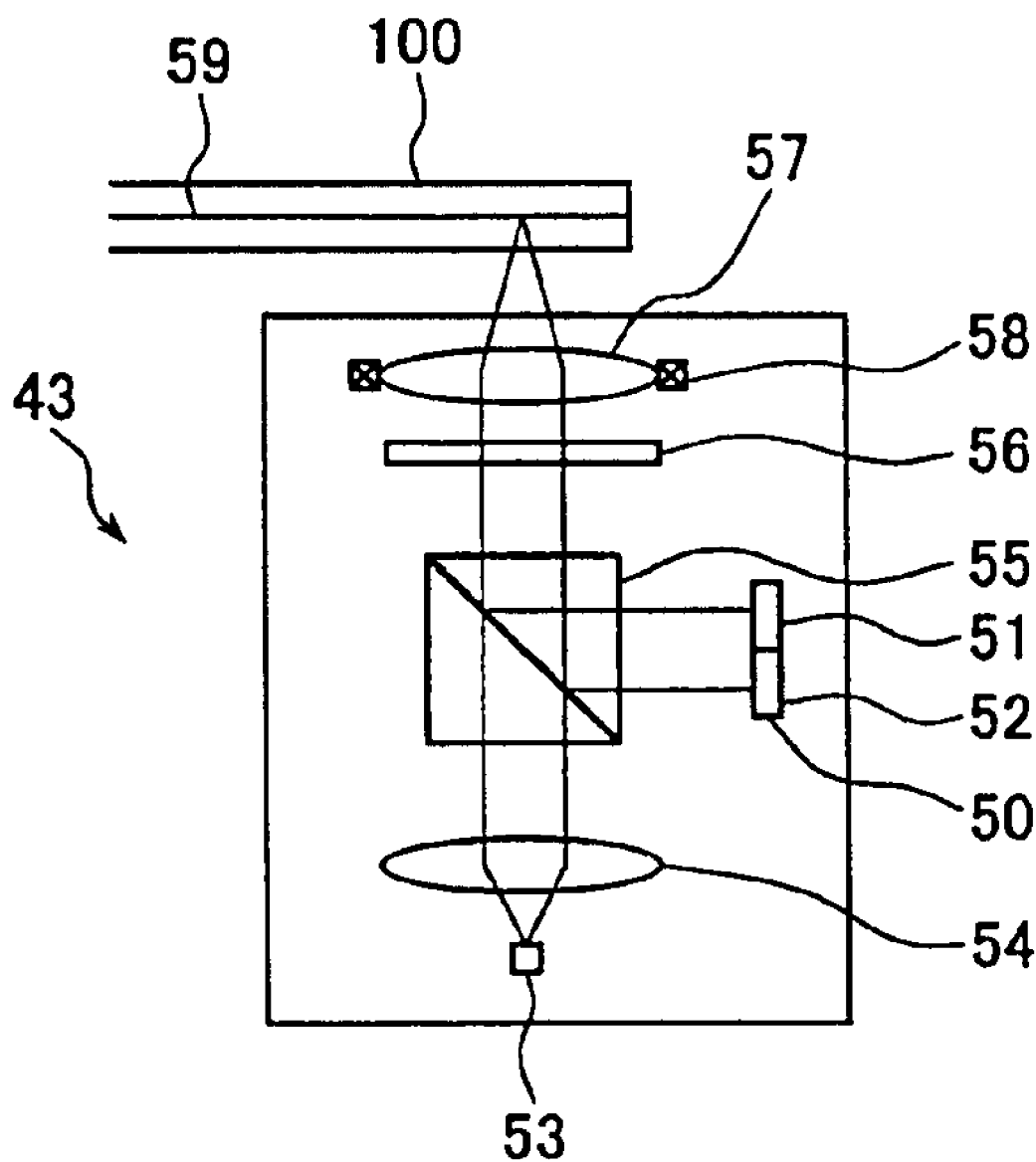
FIG. 18 is a cross-sectional view showing a configuration of an optical head of the recording/reproducing apparatus of FIG. 17.

FIG. 17 is a block diagram schematically showing the structure of an embodiment of a recording/reproducing apparatus of the present invention. FIG. 18 shows the structure of an optical head 43 of this recording/reproducing apparatus.

In the optical head 43 shown in FIG. 18, the laser light emitted from a semiconductor layer 53 is condensed on a recording layer 59 of a recording medium 100 through a collimator lens 54, a beam splitter 55, a ¼ wavelength filter 56, and an objective lens 57. The condensed laser light is focused on the recording layer 59 by adjusting the position of the objective lens 57 by a voice coil 58. The light reflected from the recording layer 59 passes through the objective lens 57 and the ¼ wavelength filter 56, is reflected by the beam splitter 55, enters a photodetector 50 and is converted to electrical signals. The photodetector 50 includes light-receiving portions 51 and 52 that are divided into two in the direction corresponding to the tracking direction of the recording medium 100.

The recording/reproducing apparatus shown in FIG. 17 includes a spindle motor 39 on which is mounted the center hole of the recording medium 100 to rotate the medium, a controller 40, a modulator 41 for converging data to be recorded to recording signals, a laser driving circuit 42 for driving a semiconductor laser in accordance with the recording signals, the optical head 43 having a semiconductor laser, an addition amplifier 44 for outputting a sum signal 44S of electrical signals output from the light-receiving portions 51 and 52 of the photodetector 50 provided in the optical head 43, a differential amplifier 45 for outputting a difference 45S signal of electrical signals output from the light-receiving portions 51 and 52, an address demodulating circuit 46 for demodulating address information from the sum signal 44S, a waveform correcting circuit 47 for generating a corrected sum signal 47S obtained by correcting the amplitude variation of the sum signal 44S with the difference signal 45S, a data demodulating circuit 48 for demodulating data information recorded on the tracks from the corrected sum signal 47S, and a tracking control circuit 49 for controlling the optical head 43 so that the laser light scans the tracks of the recording medium 100 based on the difference signal 45S appropriately.

The corrected sum signal 47S is generated by amplifying the difference signal 45S with a certain coefficient, and subtracting the result from the sum signal 44S. The generation of the corrected sum signal is particularly advantageous, for example, for demodulation of data information from information tracks including partially enlarged recording marks, as shown in FIG. 11.

Figure 19A:
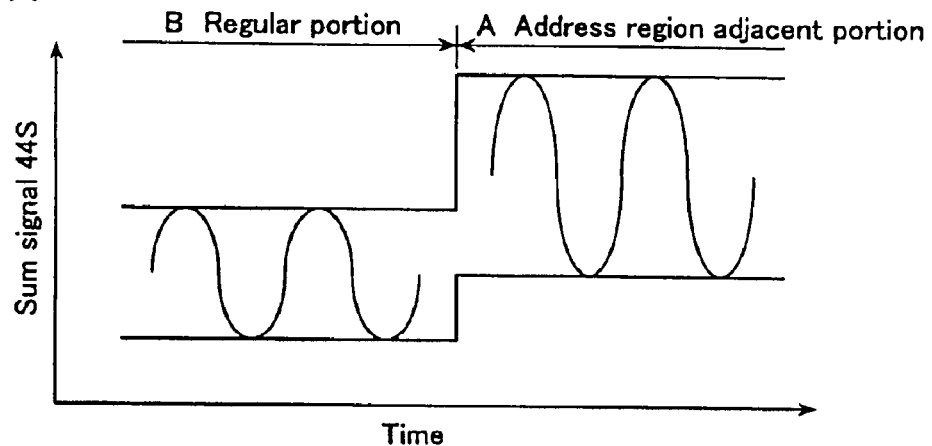
FIGS. 19A to 19C are diagrams illustrating an example of a recording/reproducing method using the recording/reproducing apparatus of FIG. 17.
Figure 19B:
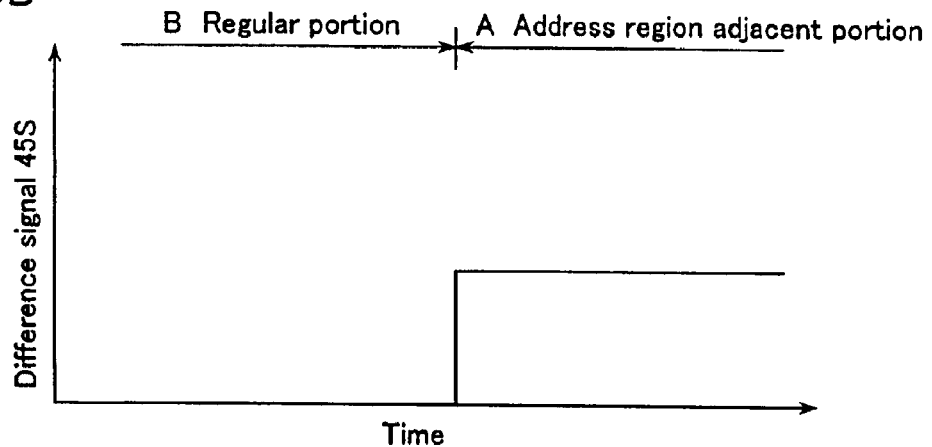
Figure 19C:
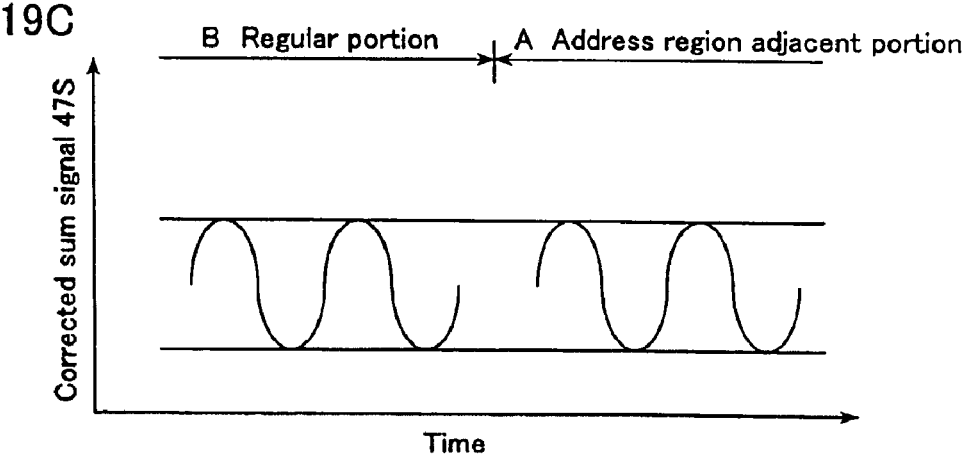

FIGS. 19A to 19C are waveform diagrams schematically showing various signals obtained from the information tracks that are provided with the recording marks 75 shown in FIG. 11. FIG. 19A shows the sum signal 44S. FIG. 19B shows the difference signal 45S. FIG. 19C shows the corrected sum signal 47S. As shown in these diagrams, since the width of the recording mark 75 in a portion A adjacent to the address region 76 is wider than that in the other portion B, an amplitude variation between the two portions occurs for the sum signal 44S. Moreover, since the land width becomes larger, the difference signal 45S also is varied. However, in the portion A adjacent to the address region, the enlarged width of the land and the enlarged width of the enlarged recording mark are substantially constant, so that the variation amounts of the sum signal 44S and the difference signal 45S are substantially constant. Therefore, the difference signal 45S is amplified with a certain coefficient and subtracted from the sum signal 44S, so that the corrected sum signal 47S without amplitude variation can be generated. This corrected sum signal allows reliable demodulation of recording information. The corrected sum signal may be generated, for example, by generating a gate signal from a change of the difference signal, and amplifying partially the sum signal in accordance with the gate signal.

As described above, it is preferable that the control band of the data demodulating circuit 48 includes the frequency of the wobbling of the information tracks of the optical information recording medium containing information to be recorded/reproduced by the recording/reproducing apparatus. This is because when reproducing information, even if a variation of a reproduction signal occurs because of a variation of the width of the groove and the land as a result of wobbling, data can be demodulated reliably.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a disk-shaped transparent substrate and n recording layers (where n is an integer of at least 2) for recording reproducing or erasing information by irradiation of laser light, the recording layers being formed over the substrate, wherein
the recording layers comprise information tracks,
the information tracks comprise information recording regions and address regions interposed between the information recording regions, the information recording regions and the address regions being arranged along a tracking direction of the laser light,
prepit addresses for providing information on a position on the recording medium are formed on the address regions, and
in at least the first recording layer to the (n-1)th recording layer from the transparent substrate side, no pair of adjacent leading edges of address regions, in the radial direction of the disk in each of the first recording layer to the (n-1)th recording layer, are arranged so as to be aligned on a straight line passing through a center of the disk.

2. The optical information recording medium of claim 1, wherein
the information tracks include groove tracks and land tracks that are formed alternately in the radial direction of the disk.

3. The optical information recording medium of claim 1, wherein steps for dividing the groove tracks from the land tracks are formed at both boundaries between the address region and two information recording regions adjacent to the address region in the radial direction of the disk.

4. The optical information recording medium of claim 1, wherein in the first recording layer to the (n-1)th recording layer from the transparent substrate side, a transmittance of the laser light is changed by recording information.

5. The optical information recording medium of claim 1, comprising a first recording layer and a second recording layer,
the first recording layer including a first information track for guiding the laser light from an inner disk circumference side to an outer disk circumference side by rotation of the disk in a predetermined direction, and
the second recording layer including a second information track for guiding the laser light from an outer disk circumference side to an inner disk circumference side by rotation of the disk in the predetermined direction.

6. An optical information recording medium comprising a disk-shaped transparent substrate and n recording layers (where n is an integer of at least 2) for recording, reproducing or erasing information by irradiation of laser light, the recording layers being formed over the substrate, wherein
the recording layers comprise information tracks including groove tracks and land tracks that are formed alternately in a radial direction of the disk,
the information tracks comprise information recording regions and address regions interposed between the information recording regions, the information recording regions and the address regions being arranged along the tracking direction of the laser light,
prepit addresses for providing information on a position on the recording medium are formed on the address regions,
a pair of adjacent information tracks in the radial direction of the disk have a common address region on which a common prepit address is formed, and in at least the first recording layer to the (n-1)th recording layer from the transparent substrate side, no pair of adjacent leading edges of common address regions, in the radial direction in each of the first recording layer to the (n-1)th recording layer, are arranged so as to be aligned on a straight line passing through the center of the disk.

7. The optical information recording medium of claim 6, wherein the prepit addresses are formed so as to straddle a boundary of a pair of information tracks in the common address regions, and steps for dividing the groove tracks from the land tracks are formed at both boundaries between the common address region and two information recording regions adjacent to the common address region in the radial direction of the disk.

8. The optical information recording medium of claim 6, wherein in the first recording layer to the (n-1)th recording layer from the transparent substrate side, a transmittance of the laser light is changed by recording information.

9. The optical information recording medium of claim 6, comprising a first recording layer and a second recording layer, the first recording layer including a first information track for guiding the laser light from an inner disk circumference side to an outer disk circumference side by rotation of the disk in a predetermined direction, and the second recording layer including a second information track for guiding the laser light from an outer disk circumference side to an inner disk circumference side by rotation of the disk in the predetermined direction.

* * * * *

UNITED STATES PATENT AND TRADEMARK OFFICE
CERTIFICATE OF CORRECTION

PATENT NO.        : 7,020,065 B2
APPLICATION NO.   : 10/600089
DATED             : March 28, 2006
INVENTOR(S)       : Akiyama et al.

It is certified that error appears in the above-identified patent and that said Letters Patent is hereby corrected as shown below:

Column 16, line 4(claim 1): "recording reproducing" should read --recording, reproducing--

Signed and Sealed this

Twenty-seventh Day of February, 2007

JON W. DUDAS
*Director of the United States Patent and Trademark Office*